Dec. 9, 1969 L. HARRISON III 3,483,426

MEANS AND METHOD FOR AUTOMATICALLY GENERATING PERSPECTIVE IN AN ELECTRONIC IMAGE DISPLAY

Filed Jan. 12, 1968 2 Sheets-Sheet 1

INVENTOR:
LEE HARRISON III
BY Kingsland, Rogers, Ezell, Eilers & Robbins
ATTORNEYS INVENTOR:
LEE HARRISON III
BY Kingsland, Rogers, Ezell, Eilers & Robbins
ATTORNEYS United States Patent Office 3,483,426
Patented Dec. 9, 1969

3,483,426

MEANS AND METHOD FOR AUTOMATICALLY GENERATING PERSPECTIVE IN AN ELECTRONIC IMAGE DISPLAY

Lee Harrison III, Englewood, Colo., assignor to Computer Image Corporation, Denver, Colo., a corporation of Delaware Continuation-in-part of application Ser. No. 607,078, Jan. 3, 1967. This application Jan. 12, 1968, Ser. No. 697,514
Int. Cl. H01j 29/70
U.S. Cl. 315—18 9 Claims

ABSTRACT OF THE DISCLOSURE

A network for producing horizontal and vertical deflection voltages for a display tube with automatic perspective of the horizontal and vertical coordinates of an image of the kind generated by an electronic image generator. Automatic perspective is coordinated to variations in distance between the display tube and the display subject and between the viewer and the display tube.

BRIEF DESCRIPTION OF THE INVENTION

This application is a continuation-in-part of Ser. No. 607,078 filed Jan. 3, 1967, now Patent No. 3,364,382 in the name of Lee Harrison III, the application Ser. No. 607,078 being a continuation of application, Ser. No. 240,970, filed Nov. 29, 1962, now abandoned.

Voltage signals corresponding to the X, Y and Z components of a display subject are resolved into H and V components of the display subject by a sine-cosine rotational transform. These H and V components are horizontal and vertical components in a plane normal to the direction of viewing the display subject. The sine-cosine rotational transform also produces a third voltage component representing the distance of each point of the display subject from a reference point (of the subject coordinate system), the distance being measured parallel to the axis of viewing the display subject.

Horizontal and vertical deflection voltages for a display tube are determined by the geometric relationship of the viewing plane they represent to the three voltage components produced by the sine-cosine rotational transform; the magnitudes of the deflection voltages vary according to a variable nominal viewing distance between the point of viewing the display subject and the plane of the display tube face and according to the variable range between the point of viewing the display subject and the point of reference of the coordinate system of the display subject. The network for combining these variables produces the voltages corresponding to horizontal and vertical deflection for the display tube.

In the aforesaid Lee Harrison III patent, a camera angle network (or sine-cosine rotational transform) is described for resolving the X, Y and Z components with voltages representing the horizontal H and vertical V components for display on the face of the display tube. To do this, the three components X, Y and Z of the three-dimensional figure are resolved into two components H and V. For the present invention, the sine-cosine rotational transform also produces a voltage representing the Z′ component normal to the H–V plane.

Figure 1:
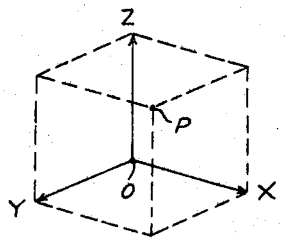
FIGURE 1 is a diagrammatic view of the X, Y and Z components for any point P of a three-dimensional display subject.
Figure 2:
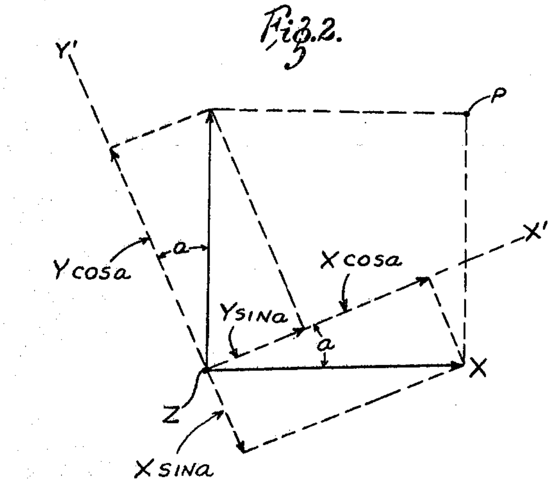
FIGURE 2 is a diagram showing the resolution of the X and Y components of FIGURE 1 into X′ and Y′ components.

To illustrate this resolution, it may be assumed that the X, Y and Z axes of FIGURE 1 represent the X, Y and Z components of a point P that is to be resolved into H, V, and Z′ components. To graphically illustrate this resolution, FIGURE 2 shows rotation of the X and Y axes about the Z axis to determine new X′ and Y′ components of the point. The angle through which this rotation occurs is designated $a$. This rotation produces new coordinates X′ and Y′ wherein $X'=X \cos a+Y \sin a$ and $$Y'=Y \cos a-X \sin a$$

Figure 3:
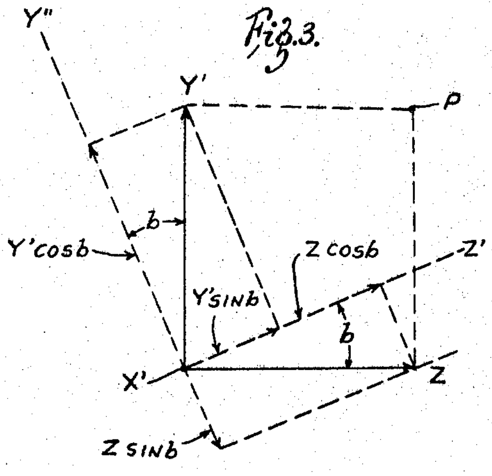
FIGURE 3 is a diagram illustrating the resolution of the Y′ and Z components developed by FIGURE 2 into Y″ and Z′ components for the point P.

Next, the Y′ Z plane is rotated about the X′ axis, as illustrated in FIGURE 3. This angle of rotation is designated $b$ and establishes two new coordinates or axes Y″ and Z′. This rotation of FIGURE 3 produces the quantities $Y''-Y' \cos b-Z \sin b$ and $Z'=Z \cos b+Y' \sin b$.

From an analysis of FIGURES 2 and 3, it is apparent that the quantities X′ and Y″ may be used to represent two dimensional axes wherein variations of the angles $a$ and $b$ permit viewing of a three-dimensional figure from any angle. Therefore, the components of the display scope without automatic perspective are as follows:

$$H=X \cos a+Y \sin a$$

$$V=(Y \cos a-X \sin a) \cos b-Z \sin b$$

For automatic perspective, the Z′ component is also needed, as will be described. An inspection of FIGURE 3 shows the $Z'=Z \cos b+Y' \sin b$. Since $$Y'=Y \cos a-X \sin a$$

the calculation for Z′ becomes $$Z'=Z \cos b+(Y \cos a-X \sin a) \sin b$$

The components X, Y and Z which position the figure in thre dimensions are resolved into two coordinates H for horizontal, and V for vertical. These H and V coordinates correspond to the horizontal and vertical deflections of a display that does not incorporate the automatic perspective of this invention. This resolution of coordinates is accomplished in a sine-cosine rotational transform or camera angle network 739, illustrated in FIGURE 5 and corresponding to the camera angle network 739 of the aforesaid Lee Harrison III patent having components numbered corresponding to the reference characters of FIGURE 5 of the present application. The camera angle network 739 includes a group of sine-cosine potentiometers or resolvers 740, 741, 742, and 743. The potentiometer 740 has a pair of contact members 745 and 746 connected together at a 90° angle to generate sine and cosine values, respectively, of inputs to the potentiometer 740. The potentiometer 741 has a pair of contacts 747 and 748 to generate sine and cosine functions, respectively, of the inputs to the potentiometer 741. The potentiometers 740 and 741 are ganged together on a common shaft 749 which is rotated by a servomechanism 750. Alternatively, the shaft 749 may be hand-operated.

The sine-cosine potentiometer 742 has a contact member 752 to generate the cosine of the input to the potentiometer 742. It also has a contact member 20 to generate the sine of its input. The potentiometer 743 has a contact member 753 to generate the sine of the input to the potentiometer 743 and a contact member 21 to generate the cosine. The potentiometers 742 and 743 are controlled by a common shaft 755 which is controlled by a servomechanism 756 or by a conventional hand control.

An electronic image generator 22 generates voltages corresponding to the X, Y, and Z components of the display (or instantaneous point P) as described in the aforesaid Lee Harrison III patent. These X, Y, and Z voltages are transmitted through conductors 709, 715, and 721.

The conductor 709 carrying the X voltage is transmitted to an inverter 758 having positive and negative outputs 759 and 760 which are connected as inputs to the potentiometer 740. These positive and negative X inputs are provided so that the sine and cosine contacts 745 and 756 can generate all sine and cosine outputs from +1 to −1. One of these outputs 761 carries a voltage representing $X \sin a$ and is connected to a subtractor 762. The other output 763 carries a voltage representing $X \cos a$ and is delivered to an adder 764.

The conductor 715 is connected to an inverter 767 having outputs 768 and 769 representing plus Y and minus Y, the output conductors 768 and 769 being connected to the potentiometer 741. This potentiometer 741 has an output conductor 770 carrying voltages representing the quantity $Y \sin a$, the conductor 770 being connected to the adder 764, and an output conductor 771 carrying voltages representing the quantity $Y \cos a$, the conductor 771 being connected to the subtractor 762.

An output conductor 772 from the subtractor 762 carries a voltage representing the quantity $$Y \cos a - X \cos a$$

This output conductor 772 is connected to an inverter amplifier 773 which has two output conductors 774 and 775 representing the positive and negative components of the input 772. These conductors 774 and 775 are connected as inputs to the potentiometer 742 which has an output conductor 776 carrying voltages representing the quantity $(Y \cos a - X \sin a) \cos b$. The conductor 776 is connected to a subtractor 779. Another output conductor 24 from the potentiometer 742 carries a voltage representing the quantity $(Y \cos a - X \sin a) \sin b$ and is connected to a subtractor 25.

The Z output conductor 721 is connected to an inverter amplifier 780 which has a plus Z output conductor 781 and a minus Z output conductor 782. These conductors 781 and 782 are connected to the potentiometer 743 which has an output conductor 784 carrying voltages representing the quantity $Z \sin b$ and an output conductor 26 carrying voltages representing the quantity $Z \cos b$. The conductor 784 is also connected to the subtractor 779, and the conductor 26 is connected to the subtractor 25. The subtractor 779 subtracts the input 784 from the input 776 to produce an output voltage in its output conductor 785 representing the quantity $$(Y \cos a - X \sin a) \cos b - Z \sin b$$

which represents the vertical component V of the beam on the display tube, but without automatic perspective.

The output conductor 795 from the adder 764 carries voltages representing the quantity $X \cos a + Y \sin a$ which is the horizontal component H without automatic perspective. An output conductor 27 from the subtractor 25 carries a voltage representing the quantity $$Z \cos b + (Y \cos a - X \sin a) \sin b$$

which is the Z′ coordinate of the point P of the display subject, as developed in FIGURE 3.

It is evident from the foregoing description that the H, V and Z′ components generated by the sine-cosine rotational transform 739 depend upon the setting of the sine-cosine potentiometers 740–743. These H, V and Z′ components will, of course, vary with changes in the X, Y and Z inputs 709, 715, and 721 as all points P for a complete display image are generated by the electronic image generator 22, but any viewing angle directed toward the three dimensional X, Y, Z coordinates of the display subject may be selected by varying the settings of the potentiometers 740–743.

Figure 4:
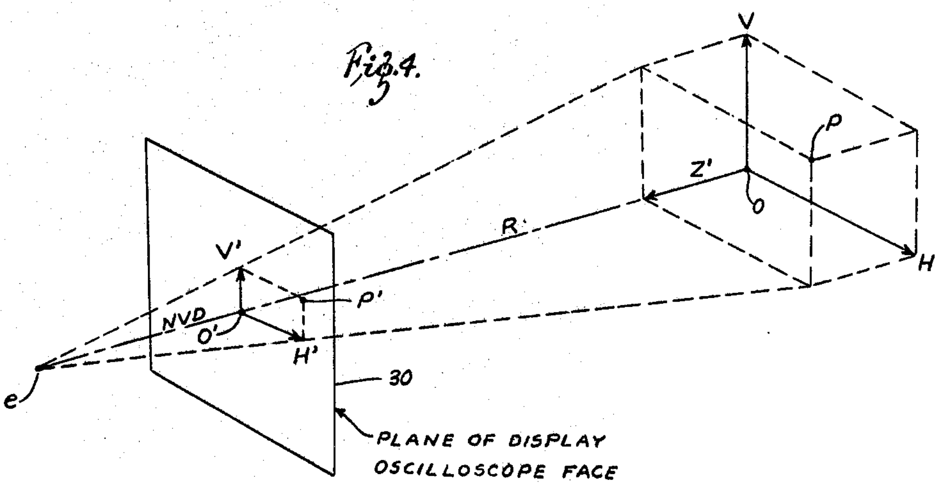
FIGURE 4 is a diagram illustrating the geometric relationship between the H, V and Z′ components and the H′ and V′ or horizontal and vertical deflection voltage components for the display oscillosope, with the nominal viewing distance and range being variable.

FIGURE 4 illustrates the development of the horizontal and vertical coordinates H′ and V′ for the display subject, utilizing perspective. In FIGURE 4, the horizontal component H (X′ of FIGURE 2), the vertical component V (Y″ of FIGURE 3), and the depth component Z′ (as developed in FIGURE 3) are shown for locating any point P from a reference point O. The reference point O may be the flyback point as discussed and described in the aforesaid Lee Harrison III patent.

These H and V coordinates of the point P define a plane which is parallel to another plane 30 corresponding to the plane of the face of the display oscilloscope. Beyond that plane 30, there is a point *e* which is the imaginary point from which the subject is viewed. The distance from the point *e* to the plane 30 is designated the nominal viewing distance NVD, and the distance from the point *e* to point O is designated range R. For convenience, NVD, R, and Z′ are drawn on a common axis from the point *e* to the point O.

In FIGURE 4, it can be seen that there are certain geometric relationships which govern. Since range R is the distance from the point *e* to the point O, the following geometric relationships apply:

$$\frac{V}{R-Z'}=\frac{V'}{NVD}$$

and $$\frac{H}{R-Z'}=\frac{H'}{NVD}$$

This produces values for Z′ and H′ as follows:

$$Z'=\left(\frac{NVD}{R-Z'}\right)Z$$

$$H'=\left(\frac{NVD}{R-Z'}\right)H$$

Figures 5, 6:
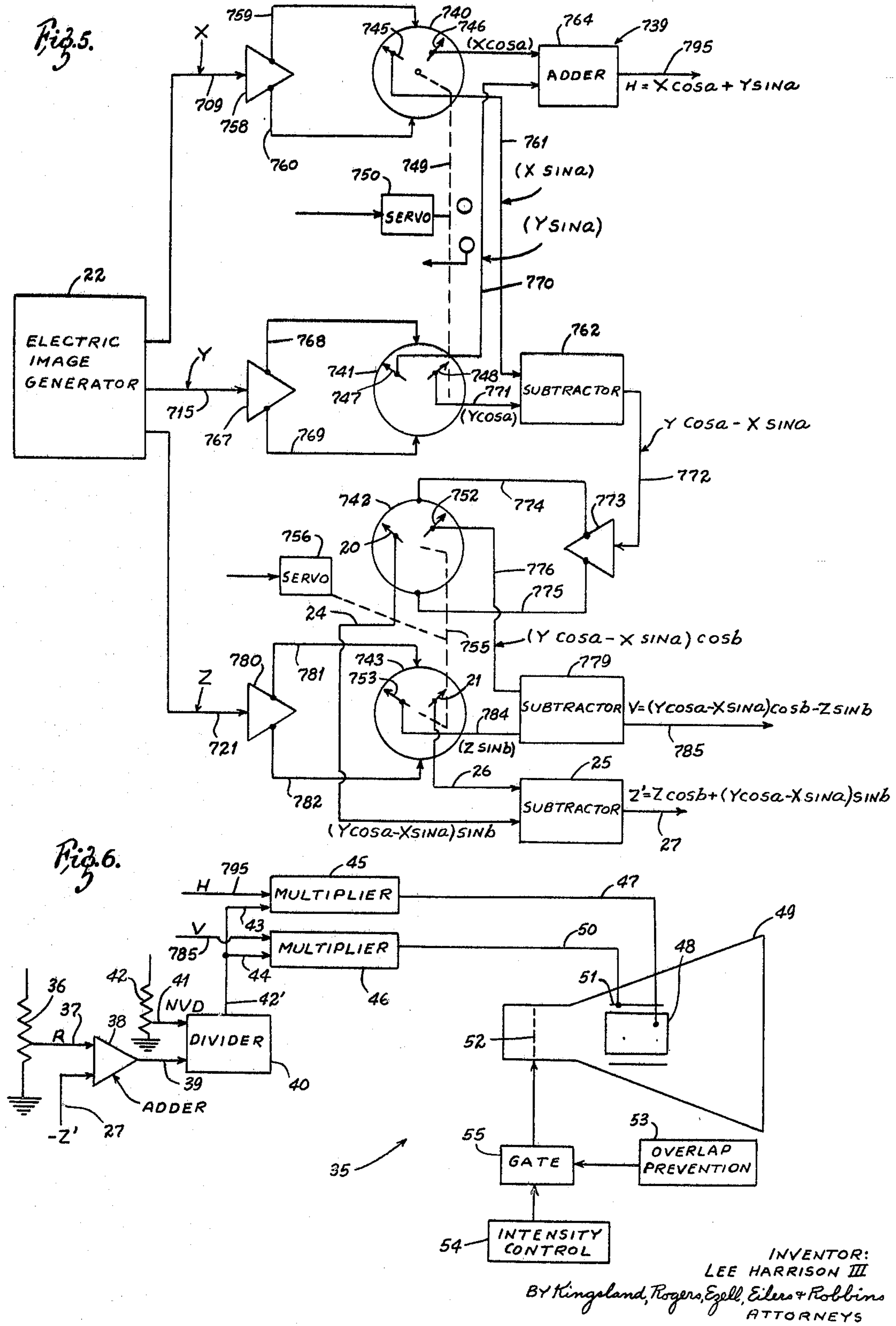
FIGURE 5 is a schematic diagram of the sine-cosine rotational transform.
FIGURE 6 is a schematic diagram for producing horizontal and vertical deflection voltages to the display oscilloscope with automatic perspective.

The network 35 for generating automatic perspective is shown in FIGURE 6. This network 35 includes a variable voltage input such as could be provided by a potentiometer 36 having a conductor 37 carrying a voltage representing the range R of FIGURE 4. This conductor 37 is connected to an adder 38. Another input to the adder 38 is the conductor 27 carrying voltages representing the quantity −Z′.

An output conductor 39 from the adder 38 carrying the voltage representing the quantity $R - Z'$ is connected to a divider 40. Another input conductor 41 to the divider 40 is connected from a variable voltage control 42, such as a potentiometer. The voltage value in the conductor 41 is set to correspond to the desired nominal viewing distance NVD of FIGURE 4.

The divider 40 performs a division of the voltage in its input conductor 41 by the voltage in its input conductor 39 and has an output conductor 42′ carrying a voltage representing the quantity $$\frac{NVD}{R-Z'}$$

This conductor 42' is connected by branches 43 and 44 to a pair of multipliers 45 and 46, respectively.

The conductor 795 carrying voltages representing the H component is also connected to the multiplier 45. The conductor 785 carrying voltages representing the V component is connected to the multiplier 46. An output conductor 47 from the multiplier 45 carries voltages representing the quantity $$\left(\frac{NVD}{R-Z'}\right)\mathrm{H}$$

or H', and is connected to the horizontal deflection plates 48 of a display tube 49. An output conductor 50 from the multiplier 46 carries voltages representing the quantity $$\left(\frac{NVD}{R-Z'}\right)\mathrm{V}$$

or V', and is connected to the vertical deflection plates 51 of the display tube 49.

The display tube 49 typically has an intensity grid 52. As described in the aforesaid Lee Harrison III patent and, if desired, with modifications as described in an application, entitled "Means and Method for Generating Shadows and Shading for an Electronically Generated Display," Ser. No. 697,456, filed contemporaneously herewith, there are means 53 for preventing overlap as the display subject is drawn on the face of the display tube 49 and there are means 54 for controlling the intensity of the drawing beam of the tube 49. The intensity control signals are supplied to a gate 55 which is opened to permit modulation of the intensity of the beam 52 as controlled by the overlap prevention network 53. When the beam of the tube 49 is to be turned off because of overlap, the overlap preventing means 53 controls opening of the gate 55 to blank the beam of the tube 49.

Thus, for continuously changing voltages representing the coordinates X, Y and Z of the display subject in three dimensions, for continuously variable viewing angles as designated by the operator in the sine-cosine rotational transform 739, for a range R that may vary as desired (as by varying the potentiometer 36), and for nominal viewing distance NVD that may vary as desired (by varying the potentiometer 42), this invention provides fully automatic perspective as the image is drawn on the face of the display tube 49.

Various changes and modifications may be made within the purview of this invention as will be readily apparent to those skilled in the art. Such changes and modifications are within the scope and teaching of this invention as defined by the claims appended hereto.

What is claimed is:

1. In a system for generating voltages corresponding to the horizontal, vertical, and depth coordinates of a display subject, an automatic perspective network for generating horizontal and vertical deflection voltages for a display device which are modifications of the generated horizontal and vertical coordinate voltages comprising means to generate horizontal and vertical deflection voltages corresponding to the said horizontal and vertical coordinate voltages but modified in predetermined relation to the nominal viewing distance between the point from which the display subject is viewed and the plane of the display device face and in predetermined relation to the range between the point from which the display subject is viewed and the plane defined by the said horizontal and vertical coordinate voltages, means to transmit the thus produced horizontal and vertical deflection voltages to the horizontal and vertical axes of the display device, and variable means to generate a selected voltage representing the said nominal viewing distance, variable means to generate a selected voltage representing the said range, means to produce a voltage representing the difference between the range and the depth coordinate voltage, means for producing a quotient voltage represented by division of the nominal viewing distance voltage by the said difference voltage, means for multiplying the said quotient voltage by the horizontal coordinate voltage, and means for multiplying the said quotient voltage by the vertical coordinate voltage to produce the horizontal and vertical deflection voltages.

2. The network of claim 1 including a sine-cosine rotational transform for producing horizontal, vertical and depth coordinate voltages by resolution from other voltages representing three-dimensional components of the display subject.

3. The network of claim 1 including means to blank the beam of the display device for preventing overlap in the display subject drawn, and means for varying the intensity of the beam of the display device when it is not blanked.

4. A method for providing automatic perspective in an electronically generated display comprising the steps of generating first, second and third coordinate voltages representing the locus of points on the surface of a display subject in three-dimensional space, resolving the first, second and third coordinate voltages into selected fourth and fifth voltages defining the horizontal and vertical coordinates of the said points in a plane normal to the direction of viewing the display subject and into sixth voltages corresponding to the depths of the said points normal to the said plane from a plane through a reference point of the display subject, establishing a voltage corresponding to the range of distance between the said reference point and the point from which the display subject is viewed, establishing voltage corresponding to the nominal viewing distance between the point of viewing the display subject and the face of a display device, calculating voltages for horizontal and vertical deflection of the beam of the display device according to the geometric relationships between the resolved fourth and fifth coordinate voltages and their triangular projections on the face of the display device as determined by the range voltage and the nominal viewing distance voltage, and controlling the horizontal and vertical deflections of the beam of the display device according to the horizontal and vertical deflection voltages.

5. The method of claim 4 including the steps of varying the range voltage and varying the nominal viewing distance voltage.

6. The method of claim 4 wherein the calculating step includes the steps of multiplying each of the fourth and fifth voltages by the quotient produced by dividing the nominal viewing distance voltage by the difference between the range voltage and the instantaneous depth voltage.

7. The method of claim 4 plus the step of blanking the beam of the display device for preventing overlap in the display subject drawn, and varying the intensity of the beam of the display device when it is not blanked.

8. In a system for generating voltages corresponding to the horizontal, vertical, and depth coordinates of a display subject, an automatic perspective network for generating horizontal and vertical deflection voltages for a display device which are modifications of the generated horizontal and vertical coordinate voltages comprising means to generate voltages proportional to the nominal viewing distance between the point from which the display subject is viewed and the plane of the face of the display device, means to generate voltages proportional to the range between the point from which the display subject is viewed and the plane defined by the said horizontal and vertical coordinate voltages, means to generate horizontal and vertical deflection voltages corresponding to the said horizontal and vertical deflection voltages but modified in predetermined relation to the said nominal viewing distance voltages and the said range voltages, and means to transmit the thus produced horizontal and vertical deflection voltages to the horizontal and vertical axes of the display device.

9. An automatic perspective network comprising means to generate voltages corresponding to the locus of horizontal and vertical coordinates of a display subject with respect to a reference coordinate, means to generate variable signals proportional to the nominal viewing distance between the point from which the display subject is viewed and the face of the display device, means to generate variable signals proportional to the range between the point from which the display subject is viewed and the planes of the points of the display subject, means to control horizontal deflection of the beam of the display device in proportion to the product of the horizontal coordinate voltages and the ratio of the nominal viewing distance signals to the range signals, and means to control vertical deflection of the beam of the display device in proportion to the product of the vertical coordinate voltages and the ratio of the nominal viewing distance signals to the range signals.

References Cited

UNITED STATES PATENTS

| | | | |
|---|---|---|---|
| 3,242,493 | 3/1966 | Westerback | 343—108 |
| 3,305,865 | 2/1967 | Gassler | 343—108 |
| 3,335,315 | 8/1967 | Moore | 315—18 |
| 3,345,632 | 10/1967 | Rover | 343—108 |

RODNEY D. BENNETT, Jr., Primary Examiner

B. L. RIBANDO, Assistant Examiner